May 19, 1970

C. W. WIEGAND 3,512,549

PILOT OPERATED RELIEF VALVE

Filed Oct. 15, 1968

INVENTOR:
CHARLES W. WIEGAND
BY
Howson & Howson
ATTYS.

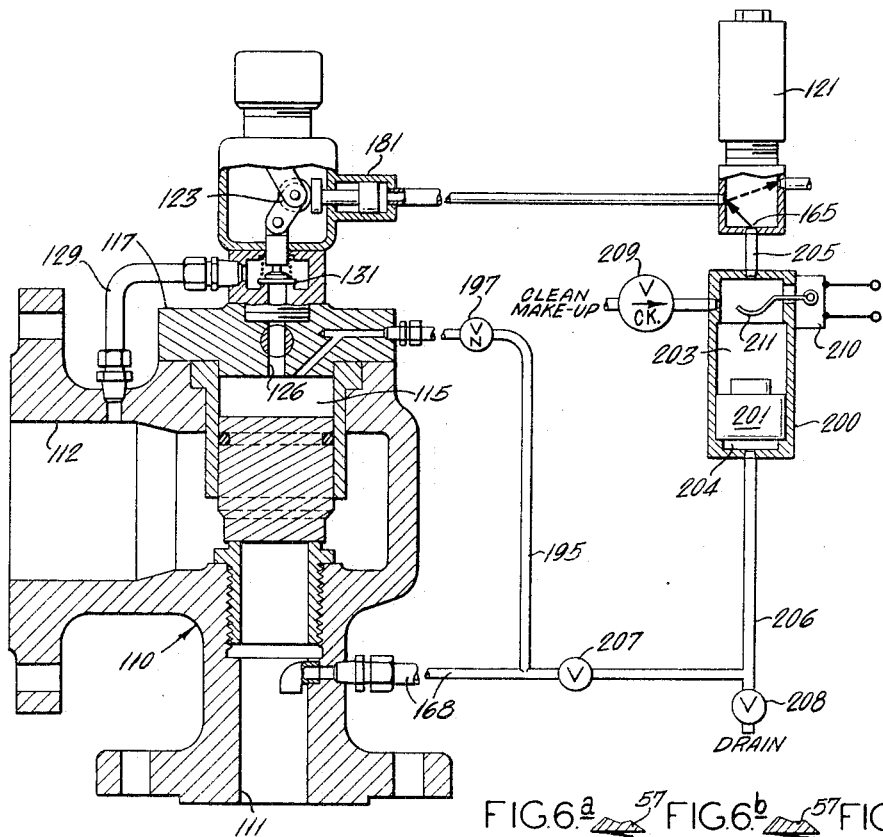
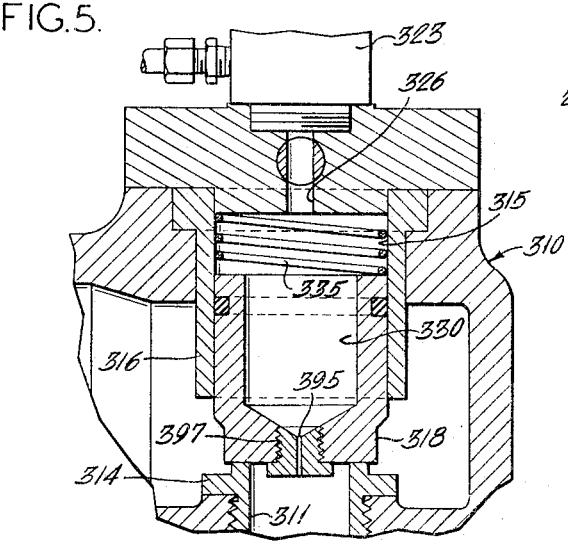
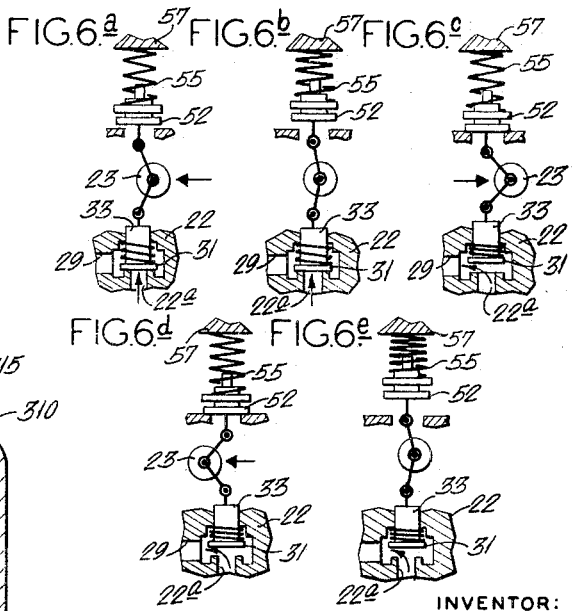

United States Patent Office 3,512,549
Patented May 19, 1970

3,512,549
PILOT OPERATED RELIEF VALVE
Charles W. Wiegand, 18 Circuit Road,
New Rochelle, N.Y. 10805
Filed Oct. 15, 1968, Ser. No. 767,607
Int. Cl. F16k 17/02
U.S. Cl. 137—489    11 Claims

ABSTRACT OF THE DISCLOSURE

A slave valve operable in response to fluid pressure in a control chamber is provided with a master valve cooperable with a pilot valve to vary the pressure in the control chamber for operating the slave valve. The master valve is actuated by a spring-loaded toggle linkage which closes the master valve when the toggle linkage is activated and which permits the master valve to open when the toggle linkage is deactivated. Pressure-responsive means engages the knee of the toggle linkage to selectively activate and deactivate the linkage in response to fluid pressure supplied thereto by the pilot valve.

---

The present invention relates to apparatus for relieving excess pressure from pressure vessels, and more particularly, the present invention relates to high-capacity pressure relief valves of the type having a pilot valve controlling the actuation of a slave valve.

Conventional high-capacity pressure relief valves of this type have a slave valve element which is engageable with a seat in the pressure vessel and which is normally held against the seat by a control pressure in a control chamber. The control chamber is connected to the pressure vessel through suitable valving which includes a pilot valve operable in response to the vessel pressure to selectively pressurize or vent the control chamber. When pressurized, the control chamber operates to maintain the slave valve element engaged with its seat against the bias of the vessel pressure. When vented, the control chamber permits the slave element to disengage its seat under the bias of the vessel pressure. The pilot valve operates to vent the control chamber only when the vessel pressure exceeds a preset pressure limit. Valves of this type, however, possess a number of disadvantages.

One of the primary disadvantages of this type of relief valve lies in the proclivity of the pilot valve to become blocked by dirt or other foreign matter, for example, by scale or by water treatment chemicals in a steam boiler. Blockage of the pilot valve passages may prevent the relief valve from functioning properly or may prevent it from operating at all. Thus, this type of relief valve is not entirely satisfactory from a safety standpoint.

In addition to the ever-present danger of pilot valve malfunction, there is additional concern for the quantity of pressure fluid which is lost each time the relief valve opens to relieve vessel pressure and then recloses to conserve vessel pressure. This is of particular concern when the pressure fluid is a valuable or toxic chemical. The quantity of fluid which is lost during reclosing is commonly referred to as blowdown, and in the interest of economy and safety, it is desirable for the blowdown to be minimized.

In some installations, it is desirable to provide a single, relatively high-capacity pilot-operated slave valve in place of a series of smaller capacity valves for a pressure vessel. In a large high-capacity slave valve however, the volume of the control chamber is correspondingly large. Since all of the pressure fluid supplied to the large control chamber must pass through relatively small openings and orifies in the pilot valve, there is a considerable time delay between the actuation of the pilot valve when the vessel pressure returns to the preset pressure limit and a rise in control chamber pressure which is sufficient to close the slave valve against vessel pressure. Accordingly, this time delay increases the blowdown from the vessel and is therefore undesirable.

With the foregoing in mind, it is a primary object of the present invention to provide a novel, pilot-operated, relief valve which provides an increased margin of safety over convention pilot-operated relief valves.

It is another object of the present invention to provide an improved relief valve which operates to reclose quickly to reduce the blowdown from a pressure vessel.

It is a further object of the present invention to provide unique pressure-relieving apparatus which operates to provide relief irrespective of the presence of foreign matter in the pressure fluid.

As a still further object, the present invention provides safe and economical master-valve-operating means for controlling the operation of relatively high-capacity slave-type relief valves.

More particularly, the present invention provides a spring-loaded or spring-controlled toggle linkage for a master valve which regulates pressure in the control chamber of a slave valve. The toggle linkage is selectively activated and deactivated by pressure-responsive means cooperable with a pilot valve which senses the pressure in a pressure vessel. The pressure-responsive means engages the knee of the toggle linkage to activate the linkage when pressure in the vessel increases, and the linkage is normally permitted to collapse into a first inactivate position to open the master valve when the pilot valve responds to a first preset pressure limit. In the event that a pilot-valve malfunction prevents the linkage from collapsing into the first inactive position, the linkage is displaced into a second inactive position to open the master valve when a second, higher preset pressure limit is exceeded. In addition, an overriding safety means is provided to permit the main valve to open should the toggle linkage malfunction when the control chamber pressure is excessive. In this manner, fail-safe pressure relief apparatus is provided.

In addition to the foregoing objects, other objects, features, and advantages will become apparent from the following description when taken in conjunction with the accompanying drawings in which:

FIG. 4 is a side elevational view in longitudinal cross-section of a modified embodiment of the present invention;

FIG. 5 is a fragmentary view in longitudinal cross-section of a modified slave valve element which may be employed in the present invention; and FIG. 6 is a series of diagrams labeled (a) through (e) showing schematically the various operating positions of the master valve and toggle linkage.

Figure 1:
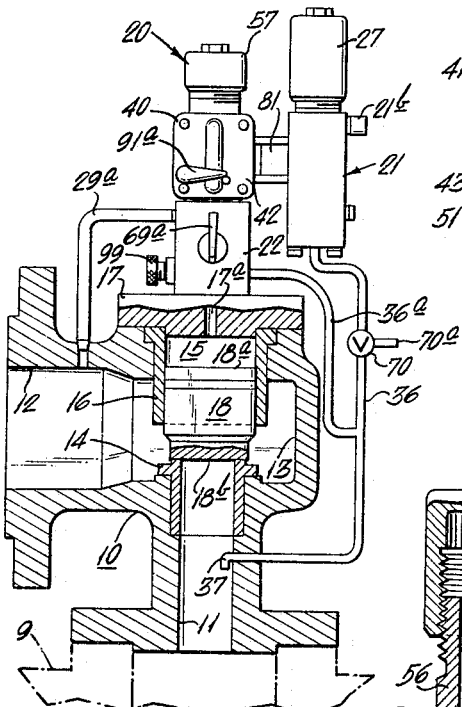
FIG. 1 is a partially sectioned, side elevational view of a pilot-operated slave valve embodying the present invention.
Figure 3:
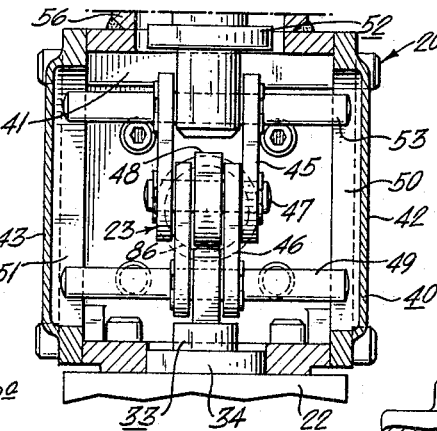
FIG. 3 is a sectional view taken along line 3—3 of FIG. 2 to illustrate the toggle linkage of the master-valve-operating means.

Referring now to the drawings, and more particularly to FIG. 1, there is illustrated a pressure relieving apparatus adapted to be installed on a relief port of a pressure vessel shown in broken lines at 9. The apparatus comprises a valve body 10 having an upwardly extending inlet passageway 11 which provides fluid communication with the interior of the pressure vessel and a lateral outlet passageway 12 which provides fluid communication with the exterior of the pressure vessel. The inlet and outlet passageways each open into a cavity 13 enclosing a valve seat 14 mounted at the upper end of the inlet passageway 11. A control chamber 15 is formed by a hollow cylinder 16 depending from a valve cap 17 and overlying the valve seat 14. In addition, a piston-like slave valve element 18 is mounted in the cylinder 16 for vertical sliding displacement into seating engagement with the slave valve seat 14.

It is customary in relief valves of this type for the slave valve element 18 to have an upper or head end 18a having a larger surface area than the lower or seating end 18b thereof, and in most valves, the ratio of head end area to seating end area is about 2 to 1. Therefore, when the same vessel pressure is simultaneously present both in the inlet passageway 11 and in the control chamber 15, the same pressure acting on different areas creates a net downward force on the slave valve element to maintain it in its seated position. However, when the pressure in the control chamber 15 is reduced to less than half of the vessel pressure in the inlet 11, the slave valve element 18 is displaced upwardly by the full vessel pressure to permit the vessel pressure to be relieved through the passageways in the slave valve.

In operation, pressure in the chamber 15 displaces the slave valve element 18 downwardly into seating engagement with its seat 14 to block fluid communication through the inlet and outlet passageways 11 and 12. The slave valve element 18 is maintained in its closed position by downwardly acting pressure in the control chamber 15 which counteracts the upwardly acting pressure in the inlet passageway 11 tending to unseat it. When the pressure in the pressure vessel reaches a predetermined upper limit, the counteracting pressure in the chamber 15 is suddenly reduced permitting the slave valve element 18 to be displaced upwardly to thereby vent pressure fluid from the pressure vessel through the passageways in the slave valve.

As described thus far, the slave valve arrangement is conventional.

Heretofore, it has been standard practice to provide a pilot valve for supplying pressure fluid to the control chamber and for regulating the pressure in the control chamber to thereby open and close the slave valve, the pilot valve being set to suddenly reduce the pressure in the chamber when the vessel pressure exceeds a preset limit. If, however, the conventional pilot valve should malfunction or fail to operate, the slave valve element remains seated and pressure in the pressure vessel further increases to create an unsafe situation.

In accordance with a primary object of the present invention, a pilot valve 21 is operatively connected with the control chamber 15, but pressure is supplied to the control chamber 15 independently of the pilot valve. The pilot valve controls relief apparatus which may operate to relieve excess pressure from a pressure vessel both in normal operation and in the event of malfunction of the pilot valve. Accordingly, the pilot valve 21 may be set to operate to relieve the vessel pressure normally at 100% of the desired vessel pressure for example, and the apparatus of the present invention may be set to operate at 105% of vessel pressure to provide a back-up for the pilot valve in the event the pilot valve fails to operate. Furthermore, the present invention provides a still further safety feature in which the control chamber pressure may be relieved even if the back-up apparatus for the pilot valve should fail. To this end, the apparatus of the present invention comprises a master or control valve assembly 20 (FIG. 1) operatively interconnecting the conventional pilot valve 21 to the control chamber 15.

In the illustrated embodiment of the present invention, the pilot valve is of a conventional construction having an inlet port 21a, an exhaust port 21b, and a control port 21c. The interior construction includes a ball valve 24 between the ports 21a and 21b and a stem valve element 25 between the ports 21b and 21c. The operating limit of the pilot valve is determined by a spring 26 which is adjustable by a rotatable cap 27.

Figure 2:
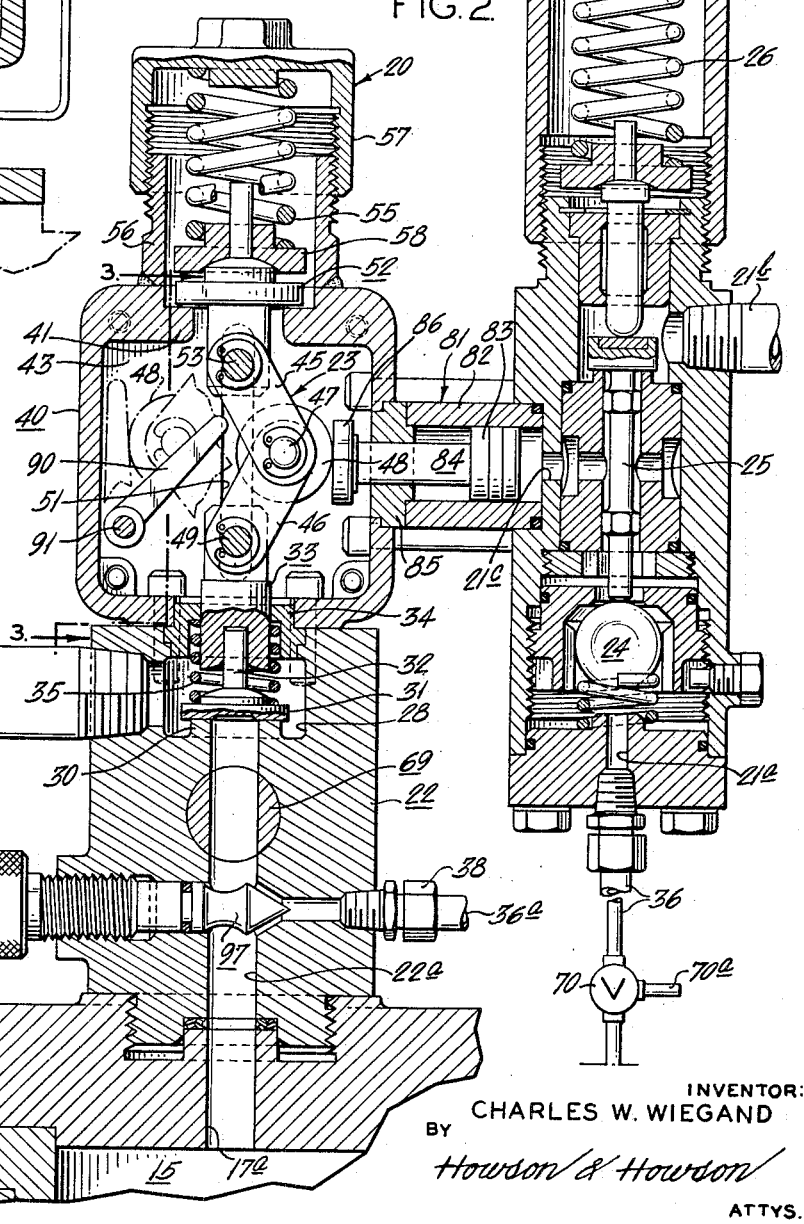
FIG. 2 is an enlarged fragmentary view in longitudinal cross-section of the master valve operating means of FIG. 1 illustrating the master valve in its closed position for closing the slave valve.

Vessel pressure below the operating limit, when supplied to the inlet port 21a, is communicated to the control port 21c through the open ball valve 24, as shown in FIG. 2. When the inlet port pressure exceeds the operating limit, the stem valve 25 is opened and the ball valve 24 is closed, whereby fluid pressure at the control port 21c is vented through the exhaust port 21b and vessel pressure is cut off from the control port. When the pressure in the inlet port 21a drops below the operating limit, the stem valve 25 is closed and the ball valve 24 is opened, so that presssure from the port 21a again is supplied to the control port 21c. The pilot valve continues to operate in this manner in response to pressure variations in the pressure vessel to selectively supply and relieve inlet pressure at its control port.

The master valve assembly 20 which operatively connects the pilot valve 21 to the control chamber 15 comprises an upright valve block 22 (FIG. 2) mounted on the slave valve cap 17, the cap 17 having a vent or port 17a in fluid communication with the control chamber 15. A passage 22a extends upwardly in the block 22 between the vent 17a and a recess 28 in the base, and an exhaust passage 29 extends laterally outward from the recess 28 and in the present instance connects with the outlet passageway 12 through an elbow 29a (see FIG. 1). A valve seat 30 surrounds the entrance of the passage 22a into the recess 28, and a valve element 31 overlies the valve seat 30 and is mounted for vertical displacement into and out of seating engagement therewith. Seating pressure is applied to the valve element 31 through a stem 32 which projects upwardly therefrom, the pressure being applied through a bearing member 33 which receives the stem 32 to provide a limited lost motion connection therebetween. The bearing member 33 slides vertically within a sleeve or bushing 34, and a light compression spring 35 is mounted between the sleeve 34 and the valve element 31 to apply a light spring pressure to normally seat the master valve element 31 and maintain the control chamber 15 closed.

Pressure from the pressure vessel is supplied to the control chamber 15 independently of the pilot valve 21. To this end, a tube 36 is connected to the interior of the pressure vessel, in the present instance as shown in FIG. 1 by an elbow 37 which opens into the inlet passageway 11 of the slave valve body 10, so as to face any flow therethrough. A branch line, in the present instance a tube 36a, interconnects the tube 36 with the control chamber 15 through a fitting 38 (FIG. 2) which opens into the passage 22a leading to the master valve element 31.

In accordance with the present invention, the conventional pilot valve 21 senses the pressure in the pressure vessel, and means is provided to cooperate with the pilot valve to selectively open and close the master valve. To this end, the master-valve-operating means comprises a spring-loaded toggle linkage 23 connected to the master valve element 31. The toggle linkage is mounted in a housing 40 on the block 22, the housing 40 having removable cover plates 42 and 43 which protect the toggle linkage from damage. The toggle linkage comprises an upper yoke 45 and a lower yoke 46 connected together at their adjacent ends by a pin 47 which mounts a roller 48 defining the knee of the toggle linkage. The lower yoke 46 is connected at its lower end to the master valve bearing member 33 by a pin 49 which extends outwardly to engage vertical guide slots 50 and 51 in the cover plates 42 and 43 respectively. The upper yoke 45 is connected at its upper end to a bearing member 52 by a pin 53 which also extends outwardly and engages the vertical guide slots 50 and 51 in the end plates. The vertical guide slots cooperate with the connecting pins to guide the movement of the toggle linkage without binding of the bearing members 33 and 52.

A spring load is applied on the toggle linkage by a main compression spring 55 enclosed within a neck 56 projecting upwardly from the housing 40. A bonnet 57 is threadedly mounted on the neck 56 and engages the upper end of the spring 55. The lower end of the mainspring 55 engages the bearing member 52 through a disc 58 shaped to properly seat the spring against the bearing member. In this manner, the spring is compressed between the bonnet 57 and the bearing member 52 to apply a downward force to the master valve through the toggle linkage when the latter is in an active position, as shown. In addition, a shoulder 41 is provided on the housing 40 to limit the downward travel of the bearing member 52, for example when the toggle is displaced to an inactive position, and to permit the magnitude of the spring pressure applied to the master valve element to be adjusted. The spring pressure is thereby adjusted by rotating the bonnet 57. Therefore, with this arrangement, the line of action of the spring force is aligned with the displacement path of the master valve element, so that spring pressure applied to the master valve increases as the toggle linkage is activated or straightened and decreases as the toggle linkage is deactivated or collapsed.

In normal operation, the pilot valve 21 controls the position of the toggle linkage through a pressure-responsive means 81 which is connected to the control port 21c of the pilot valve and operates on the knee of the toggle. The inlet port 21a of the pilot valve is connected to the pressure vessel through a normally-open valve 70 and the tube 36, so that when the vessel pressure is below a preset operating limit the control port 21c is connected to vessel pressure, and when the vessel pressure is above the operating limit, the control port 21c is vented through the exhaust port 21b.

In the present instance, the pressure responsive means 81 comprises a cylinder 82 mounted between the linkage housing 40 and the pilot valve 21. A piston 83 is mounted in the cylinder 82 for displacement rightward and leftward in the cylinder. A rod 84 is connected at one end to the piston 83 and extends leftward outwardly of the cylinder 82 through a bushing 85 to terminate in a pressure plate 86 which engages the roller 48 at the knee of the toggle linkage. The piston is subjected to the pressure of the control port 21c of the pilot valve, so that when pressure is supplied to the control port, the piston 83 is urged leftward to activate the toggle linkage. When pressure is relieved from the control port 21c, the piston and the spring-loaded toggle linkage are free to move rightward to an inactive position which permits the master valve to open. When the valve 31 opens, the control chamber 15 is vented, reducing its pressure.

In its normal operating position, as illustrated in FIG. 2, the toggle linkage 23 is activated to partially compress the mainspring 55 and close the master valve 31. Thus, counteracting vessel pressure is confined in the control chamber 15 to keep the slave valve closed. This activated linkage position is illustrated schematically in FIG. 6(a). As the vessel pressure increases toward a first preset limit, the pressure-responsive means causes the toggle linkage 23 to further compress the mainspring 55. The closing force on the master valve thereby increases against increasing counteracting pressure in the control chamber 15. This linkage position is illustrated schematically in FIG. 6(b). When the vessel pressure exceeds the first limit sensed by the preset pilot valve 21, the pressure-responsive means 81 is vented by the pilot valve, and the toggle linkage 23 is deactivated by its rightward movement and open the master valve 31 as illustrated schematically in FIG. 6(c). When the master valve is opened, the counteracting pressure in the control chamber 15 is reduced and the slave valve element 18 is unseated to relieve excess pressure from the pressure vessel.

The slave valve element 18 elevates within the control chamber 15 as the pressure is reduced therein when the master valve opens. The pressure in the control chamber is not completely reduced to atmospheric pressure however, since pressure fluid from the vessel is continuously being admitted to the control chamber 15 located downstream of the tube 38 and passageway 22a. A downstream pressure, lower than vessel pressure, is thereby developed in the control chamber 15 which limits the elevation of the slave valve element 18 and prevents the slave valve from opening completely for affording full flow through the slave valve seat 14. In accordance with the present invention, means is provided to control the downstream pressure in the control chamber for adjusting the amount of opening of the slave valve.

To this end, a flow restrictor, in the present instance a needle valve 97 (FIG. 2) is threaded into the valve block 22 and registers with a valve seat or port 98 which provides fluid communication of the control chamber with the pressure vessel from the passageway 22a through the tube fitting 38. The needle valve 97 is manually adjusted by a knurled operator 99. Therefore, when the master valve is open and the needle valve 97 is partially opened, the downstream pressure in the control chamber 15 is lowered and the slave valve opens. Conversely, when the master valve is open and the needle valve is fully opened, the downstream pressure in the control chamber is raised and the slave valve may not open fully, substantial quantities of the fluid in the vessel venting through the needle valve and master valve. Thus, by manipulating the needle valve, the downstream pressure in the control chamber 15 may be controlled to adjust the discharge capacity of the slave valve.

After a sufficient quantity of pressure fluid has been exhausted from the pressure vessel to relieve the excess pressure in the vessel, the pilot valve 21 operates to pressurize the pressure-responsive means 81 which returns the toggle linkage 23 to its normal operating position for closing the master valve 31. When the master valve closes, pressure fluid supplied to the control chamber 15 displaces the slave valve element downwardly to reclose the slave valve. The speed with which the slave valve recloses however, depends upon the adjusted position of the needle valve. Thus, when the needle valve is only partially open, the chamber 15 is pressurized slowly and the slave valve recloses slowly. When the needle valve is wide open the chamber 15 is pressurized rapidly and the slave valve recloses rapidly. It should be noted however, that although the slave valve recloses rapidly with the needle valve wide open, this needle valve position raises the downstream pressure developed in the chamber 15 and tends to prevent the slave valve from opening fully. Accordingly, the needle valve must be properly adjusted to provide optimum performance.

While the foregoing describes the normal operation of the present valve assembly for opening and reclosing the slave valve in response to pressure sensed by a pilot valve, a major feature of the present valve assembly is its ability to relieve excess vessel pressure in the event of failure of the pilot valve. Accordingly, reference is again made to FIG. 2 and schematic FIG. 6(a) which illustrate the normal operating positions of the valve assembly. In the event of pilot valve failure preventing normal venting of the pressure-responsive means 81 to deactivate the toggle linkage rightward, pressure in the vessel rises. As the vessel pressure rises, pressure supplied to the pressure-responsive means 81 diplaces the toggle linkage further leftward and further compresses the mainspring 55 as may be seen schematically in FIG. 6(b). When the vessel pressure exceeds the limit as determined by the adjusted compression of the mainspring 55, the toggle linkage 23 is displaced still further leftward past its dead-center position into a leftward inactivated position (FIG. 6(d)). The master valve 31 is thereby opened to relieve pressure in the control chamber 15 for opening the slave valve.

Once the toggle linkage 23 is displaced into its leftward inactivated position as may be seen in broken lines in FIG. 2, the master valve 31 remains open and the slave valve continues to blow down the pressure vessel, creating an audible signal. The blowdown is arrested when the master valve 31 is again closed to reclose the slave valve. To this end, a lever 90 is pivotally mounted on a shaft 91 in the linkage housing 40 and engages the roller 48 at the knee of the toggle linkage 23. A handle 91a (FIG. 1) is connected to the shaft 91 on the outside of the housing 40 to permit an operator hearing the signal to rotate the lever 90. The lever 90 thereby displaces the toggle linkage rightward past its dead-center position and into its normal operating position to close the master and slave valves and arrest blowdown from the pressure vessel.

In addition to the ability of the present valve assembly to operate independently of the pilot valve in an abnormal situation, the present invention provides a still further fail-safe feature to permit the valve assembly to operate in the event the pressure-responsive means 81 connected to the pilot valve 21 fails. For example, if the piston 83 should freeze in the cylinder 82 when the toggle linkage is in any activated position between its rightward inactive position and dead-center, pressure in the vessel and in the control chamber 15 increases without displacing the toggle linkage. When this pressure exceeds the pressure exerted by the compressed mainspring 55, the master valve element 31 and the toggle linkage 23 is displaced upwardly against the bias of the mainspring 55 (see FIG. 6(e)). The master valve 31 thereby opens and partially exhausts the control chamber 15 to open the slave valve and relieve excess pressure from the pressure vessel.

In order to permit the pilot valve to be periodically tested without blowing-down the pressure vessel, a plug valve 69 (FIG. 2) having an operator 69a (FIG. 1) is mounted in the base 22 of the master valve, and a three-way valve 70 having a test connection 70a is connected to the tube 36. The pilot valve is tested with pressure in the vessel by closing the plug valve 69 and setting the three-way valve 70 to permit test pressure to be applied to the pilot valve 21 through the test connection 70a by conventional test apparatus (not shown). The pilot valve may then be adjusted by rotating the cap 27 until the desired operating pressure limit is set. Furthermore, the back-up for the pilot valve may also be adjusted in a similar manner by blocking the pilot valve exhaust port 21c and applying test pressure while rotating the bonnet 57 on the toggle-linkage housing 40.

In accordance with another object of the present invention, a slave-type relief-valve assembly may be provided with additional safety features. To this end, as shown in FIG. 4, a slave valve 110, similar to the slave valve of FIG. 1, is provided with a modified valve cap 117 having an upwardly extending vent 126 providing fluid communication between a control pressure chamber 115 and a master valve 131. The master valve 131 is actuated by a spring-loaded toggle linkage 123 which is similar in all respects to the toggle linkage illustrated in FIG. 2. Fluid communication is provided between the control-pressure chamber 115 and an inlet passageway 111 in the slave valve by conduit means 195 connected to a pressure sensing tube 168 which opens downwardly into the inlet passageway 111. A conventional pilot valve, shown generally at 121, is provided to actuate the master-valve toggle-linkage 123 in response to a predetermined upper pressure limit in the pressure vessel. In addition, a separate needle valve 197 is provided to control the rate of fluid flow through the conduit means 195 and into the control pressure chamber 115 to adjust the capacity and the reclosing time of the slave valve.

The additional safety features are realized by obviating the tendency of the pilot valve to become blocked with dirt or foreign matter contained in the pressure fluid in the pressure vessel. To this end, means is provided to supply relatively clean operating fluid to the pilot valve at a pressure substantially equal to the pressure in the pressure vessel. The fluid supply means comprises a cylinder 200 closed at each end and having a piston 201 mounted for vertical displacement therein. The piston 201 divides the cylinder 200 into an upper chamber 203 and a lower chamber 204. The upper chamber 203 of the cylinder is in fluid communication with an inlet port 165 of the pilot valve 121 through a tube 205. The lower chamber 204 of the cylinder is in fluid communication with the interior of a pressure vessel through a tubular conduit 206, which in the present instance is connected to the slave valve inlet passageway 111 through the pressure sensing tube 168. An electrical alarm 210 is mounted adjacent the upper end of the cylinder 200. The alarm 210 has an operator 211 extending into the upper portion 203 of the cylinder 200, so that when the piston 201 reaches its uppermost position, the operator 211 is deflected upwardly to close the alarm switch 210 and actuate an audio or visual alarm to indicate that the upper chamber of the cylinder is empty.

Clean operating fluid, for example filtered air, is supplied to the upper chamber of the cylinder through a check valve inlet 209 adjacent the upper end of the cylinder 200. A pair of valves 207 and 208 are connected to the tubular conduit 206 and are manipulated to facilitate the charging of the cylinder with operating fluid. Thus, when the valve 208 is closed and the valve 207 is opened, vessel pressure is supplied to the lower portion 204 of the cylinder. The piston 201 transmits the vessel pressure to the operating fluid in the cylinder 200 so that the operating fluid pressure is substantially equal to the pressure in the pressure vessel.

Thus, the pilot valve 121 and the pressure-responsive means 181 of the master valve operating means 123 are exposed only to relatively clean operating fluid at vessel pressure. This reduces the tendency for these elements to become blocked as would occur if they were directly exposed to the contaminated fluid in the pressure vessel. This arrangement may also be used for venting vessels for fluids which, because of their viscosity or other characteristics, are not readily susceptible to control by valving. In such a case, the control chamber 115 may also be supplied with operating fluid by connections to the upper chamber 203 instead of being supplied with vessel pressure fluid through the tube 168.

It should be noted that when the operating fluid is charged into the cylinder, the charging pressure must not be excessive, since, at start-up, this pressure is added to the vessel pressure and would result in inaccurate operation of the pilot valve. Although excessive charging pressure is to be avoided, a slight residual charging pressure in the cylinder is advantageous since it is sufficient to maintain the master valve in a normally closed position. In addition, even though a volume of operating fluid is discharged from the cylinder each time the pilot valve operates, the construction of the pilot valve 121 and pressure-responsive means 181 is such that the volume discharged is relatively small. In this manner sufficient operating fluid is contained in the cylinder to operate the pilot valve for a number of relief cycles, the piston inching upwardly in the cylinder each time the pilot valve operates, and contacting the alarm switch only when the operating fluid is exhausted from the cylinder. As may be seen in FIG. 4, an elbow 129 connects the master valve 131 with a lateral outlet 112 in the slave valve body 110. Therefore, when the slave valve 110 is connected in a closed system, corrosive, noxious or contaminated pressure fluid is not vented to the atmosphere when the slave valve blows down.

Heretofore, there have been applications for which the conventional slave-type relief valve has not been suited. A primary example of this is where pressure fluid in a pressure vessel condenses readily under ambient temperature and pressure conditions. Since these conditions are approximated in the control chamber of the slave valve when the pilot valve opens to vent pressure fluid from the control chamber in the conventional arrangement, any condensed pressure fluid which has accumulated in the control chamber vaporizes and tends to maintain the pressure in the control chamber thereby preventing the slave valve from opening. This creates a safety hazard, since a considerable time delay may elapse between the actuation of the pilot valve at a preset pressure and the operation of the slave valve. Therefore, in accordance with another important object of the present invention, a slave-type relief valve may be provided which operates to quickly relieve pressure from a pressure vessel regardless of the propensity of the pressure fluid to change state under ambient temperature and pressure conditions.

To this end, a slave valve 310 (FIG. 5), constructed similarly to the slave valve illustrated in FIG. 1, is provided with a modified slave-valve element 318 mounted for vertical displacement in a cylinder 316 defining a control pressure chamber 315. Pressure fluid is admitted to the chamber 315 through an orifice 395 mounted in a threaded passageway 397 in the valve element 318 adapted to register with the cooperating inlet passageway 311 from the pressure vessel. The fluid is relieved through a port 326 when a master valve in a valve block 323 at its upper end is opened (by the toggle assembly not shown). Thus, the slave-valve element 318 is maintained in engagement with its seat 314 when the master valve is closed and pressure fluid is admitted to the control chamber 315.

According to this aspect of the present invention, the slave-valve element 318 has an upwardly opening central cavity 330 which tapers inwardly and downwardly at its lower end toward the passageway 395 in its bottom wall. Therefore, pressure fluid which condenses in the cavity 330 is drained through the orifice 395 into the inlet passageway 311 of the slave valve. In this manner, pressure liquid in the control chamber 315, the vaporization of which tends to retard the upward displacement of the slave-valve element when the master valve is opened, is thereby eliminated, so that the slave valve is permitted to open rapidly at a predetermined pressure limit. To obtain initial seating of the slave-valve element 318 against its seat 314, a light spring 335 may be added to assist the gravitational force of the valve element. The threaded engagement of the orifice 395 in the bottom of the valve element permits ready replacement, affording an adjustment similar to the adjustments provided by the needle valves of the previously described embodiments. In addition, an additional advantage is realized from this slave valve construction, since the pressure fluid required to maintain the slave-valve element seated when the master valve is closed is supplied to the control pressure chamber through the orifice 395. Thus, this construction provides a slave-type relief valve, which is compact and which operates effectively to quickly relieve pressure from a pressure vessel irrespective of the properties of the pressure fluid in the vessel.

In view of the foregoing, it should now be apparent that the pressure relieving apparatus of the present invention provides an additional margin of safety over conventional relief valves. Moreover, it has been seen that the present invention provides a slave-type relief valve which operates quickly to reduce the blowdown from a pressure vessel and which operates satisfactorily regardless of the properties of the pressure fluid in the pressure vessel.

What is claimed is:

1. In a valve assembly adapted to relieve excess pressure from a pressure vessel, the assembly comprising a master valve, a slave valve having a control-pressure chamber slidably mounting a valve element for displacement between open and closed valving positions, and a pilot valve operable in response to pressure in the vessel for actuating the master valve at a preset pressure limit, the improvement comprising:

means to supply pressure fluid to said control chamber independently of said pilot valve, a mainspring spaced from said master valve and having its line of action operable along the displacement path of said master valve, a toggle linkage mounted in said line of action intermediate said mainspring and said master valve, said toggle linkage connected to said master valve and normally displaceable between an activated position to close said master valve and a deactivated position to permit said master valve to open, pressure-responsive means operatively connected between said toggle linkage and said pilot valve to activate said toggle linkage in response to pressure fluid normally supplied thereto by said pilot valve and to deactivate said toggle linkage in response to pressure fluid exhausted therefrom by said pilot valve at a preset pressure limit, whereby when the pressure fluid normally supplied to the pressure-responsive means is exhausted therefrom by the pilot valve, the toggle linkage is deactivated to permit the master valve to open, thus operating the slave valve to relieve excess vessel pressure.

2. Apparatus according to claim 1 wherein said pressure-fluid-supply means has a flow restrictor for regulating the flow of pressure fluid to the control chamber, so that the capacity and the operating response-time of the slave valve may be controlled.

3. Apparatus in accordance with claim 2 wherein said master valve comprises a valve block mounted on said slave valve, passage means providing fluid communication through said valve block from said control chamber, and a master-valve element mounted in said passage means for displacement between open and closed valving positions; said pressure-fluid-supply means includes a conduit opening through a port at one end into said passage means to provide fluid communication between said passage means and the pressure vessel; and said flow restrictor is a needle valve threaded into said valve block to register with said conduit port, so that when the needle valve is rotated, the flow of pressure fluid into the control chamber is regulated to adjust the operating characteristics of the valve assembly.

4. Apparatus according to claim 3 wherein said master-valve block mounts a plug valve in registry with said passage means intermediate said master-valve element and said conduit port, whereby the pilot valve and the toggle linkage cooperating therewith may be periodically tested and adjusted without blowing-down the pressure vessel.

5. Apparatus in accordance with claim 1 wherein said slave valve has a valve seat adjacent said control chamber and said valve element is disposed above said valve seat for displacement downwardly into engagement therewith in response to fluid pressure in the control chamber, said slave-valve element having a cavity in its upper end opening into the control chamber for receiving condensed pressure fluid, and said pressure-fluid-supply means comprises an orifice in the bottom of said slave-valve element providing fluid communication through said valve seat from said cavity, whereby condensed fluid which accumulates in the control chamber is drained downwardly through the orifice and operating pressure fluid is supplied upwardly to the control chamber through the orifice.

6. Apparatus in accordance with claim 5 wherein said orifice is threaded into the bottom of said slave-valve element to permit rapid removal and replacement of the orifice for adjusting the operating characteristics of the valve assembly.

7. Apparatus in accordance with claim 1 wherein said pilot valve has a control port and said pressure-responsive means comprises a cylinder connected at one end to said control port, a piston mounted in said cylinder for displacement away from said control port in response to fluid pressure supplied thereto, said piston having means projecting outwardly of said cylinder to engage the knee of the toggle linkage, so that when vessel pressure is supplied to the control port and the piston is displaced away from said control port, said means activates the toggle linkage and compresses the mainspring for increasing the seating pressure on the master valve, whereupon in the event of pilot valve malfunction which prevents the toggle linkage from being normally displaced toward the control port to permit the master valve to open, when vessel pressure increases at the control port to displace the piston further away from the control port, said means may operate the toggle linkage past the line of spring action into a deactivated position which permits the master valve to open.

8. Apparatus in accordance with claim 1 wherein said valve assembly includes means to isolate the pilot valve from vessel-pressure fluid and to supply the pilot valve with a separate operating pressure fluid at a pressure substantially equal to the fluid pressure in the pressure vessel, whereby the separate operating fluid supplied to the pilot valve reduces the tendency for the pilot valve to malfunction and thereby improves the safety characteristics of the valve assembly.

9. Apparatus according to claim 8 wherein said pilot valve isolation and fluid supply means comprises a cylinder in fluid communication at one end with an inlet port in the pilot valve and in fluid communication at its other end with the pressure vessel, a piston mounted within said cylinder, and means to charge said cylinder at said one end with a supply of said operating fluid, whereby vessel pressure displaces the piston and pressurizes the fluid in the cylinder so that relatively clean operating fluid is supplied to the pilot valve at a pressure substantially equal to the vessel pressure.

10. Apparatus in accordance with claim 1 including means for biasing said master valve into a normally closed position for cooperating with the slave valve to permit pressure build-up in said control chamber to close said slave valve and thereby said vessel in the absence of sufficient vessel pressure to activate said toggle linkage, the pressure of said biasing means affording opening of said master valve when the pressure in said control chamber is at said preset pressure limit.

11. Apparatus in accordance with claim 10 including a lost motion connection between said toggle linkage and said master valve to permit displacement of said master valve to its normally closed position by said biasing means independently of the activation of said toggle linkage.

References Cited
UNITED STATES PATENTS

| | | | |
|---|---|---|---|
| 143,920 | 10/1873 | Mayer | 137—489 |
| 643,239 | 2/1900 | Schreidt | 137—488 |

M. CARY NELSON, Primary Examiner

R. B. ROTHMAN, Assistant Examiner

U.S. Cl. X.R.

137—492.5; 251—73